US009326014B2

(12) United States Patent
Rowe (10) Patent No.: US 9,326,014 B2
(45) Date of Patent: Apr. 26, 2016

(54) METHOD AND SYSTEM FOR CORRELATING TV BROADCASTING INFORMATION WITH TV PANELIST STATUS INFORMATION

(75) Inventor: Simon Michael Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 66 days.

(21) Appl. No.: 13/531,413

(22) Filed: Jun. 22, 2012

(65) Prior Publication Data

US 2013/0347016 A1    Dec. 26, 2013

(51) Int. Cl.

| | |
|---|---|
| H04N 21/2747 | (2011.01) |
| H04N 21/414 | (2011.01) |
| H04N 21/422 | (2011.01) |
| H04N 21/443 | (2011.01) |
| H04N 21/63 | (2011.01) |
| H04N 21/6543 | (2011.01) |
| H04N 21/8547 | (2011.01) |
| H04N 21/25 | (2011.01) |
| H04N 21/258 | (2011.01) |
| H04N 21/442 | (2011.01) |

(52) U.S. Cl.
CPC ....... *H04N 21/252* (2013.01); *H04N 21/25866* (2013.01); *H04N 21/44222* (2013.01)

(58) Field of Classification Search
None
See application file for complete search history.

(56) References Cited

U.S. PATENT DOCUMENTS

| 7,389,089 | B1 * | 6/2008 | Nguyen et al. ................. 455/73 |
|---|---|---|---|
| 2007/0173284 | A1 * | 7/2007 | Chie .......................... 455/552.1 |
| 2007/0180459 | A1 * | 8/2007 | Smithpeters ........... H04H 60/59 725/19 |
| 2007/0271518 | A1 | 11/2007 | Tischer et al. |
| 2009/0021474 | A1 * | 1/2009 | Bentley .............. H04N 7/17318 345/156 |
| 2009/0089823 | A1 * | 4/2009 | Mears .................... H04H 60/31 725/14 |
| 2009/0113481 | A1 * | 4/2009 | Friedman ........... H04N 5/44543 725/46 |
| 2010/0306404 | A1 * | 12/2010 | Wakita et al. ................. 709/231 |
| 2012/0084801 | A1 | 4/2012 | Rowe et al. |
| 2013/0052938 | A1 * | 2/2013 | Ramaswamy ..... G06Q 30/0201 455/2.01 |

FOREIGN PATENT DOCUMENTS

| WO | WO 99/57707 A1 | 11/1999 |
|---|---|---|
| WO | WO 2012/047853 A1 | 4/2012 |

OTHER PUBLICATIONS

Google Inc., International Search Report and Written Opinion, PCT/US2013/046832, Nov. 28, 2013, 15 pgs.

\* cited by examiner

*Primary Examiner* — Brian T Pendleton
*Assistant Examiner* — Jean D Saint Cyr
(74) *Attorney, Agent, or Firm* — Foley & Lardner LLP; John D. Lanza (57) ABSTRACT

A computer system for determining TV viewership information for one or more TV panelists is provided, the computer system having memory to store programs and one or more processors for executing the one or more programs. The programs include instructions for: receiving TV broadcast information from a TV metering device, wherein the TV broadcast information identifies a current status of a TV in a household and an associated timestamp; receiving TV panelist status information from a first login/logout device that is different from the TV metering device, wherein the TV panelist status information identifies a viewership status of the TV panelist and an associated timestamp; and correlating the TV broadcast information with the TV panelist status information in accordance with their respective timestamps to determine a relationship between the TV panelist and a respective TV program currently broadcasted by the TV in the household.

20 Claims, 5 Drawing Sheets

METHOD AND SYSTEM FOR CORRELATING TV BROADCASTING INFORMATION WITH TV PANELIST STATUS INFORMATION

TECHNICAL FIELD

The disclosed implementations relate generally to a TV viewership management system, and in particular, to system and method for correlating TV broadcasting information with TV panelist status information.

BACKGROUND

It is important to advertisers, content producers and broadcasters to be able to ascertain the scope and characteristics of TV viewership for their programs. However, the nature of TV viewership, where broadcast programs can be displayed to one or many viewers, and where viewers can come and go during a program, presents a challenge to the accurate measurement of such numbers and characteristics. TV viewership agencies have adopted a number of approaches to determine who is watching TV and what they are watching. For example, some agencies provide participants in TV viewership panels with a TV metering device (a piece of hardware) that can perform a number of functions related to monitoring TV viewing. For example, a TV metering device can include a microphone so that it can listen to the TV and determine which channel is being played. A TV metering device can also incorporate a user interface from which a participant can indicate when they start or stop watching the TV. In addition, a TV metering device can allow a panel participant to log into (or out of) his or her account by interacting with the device directly, through the user interface, or by sending instructions to the device using a remote control. The TV metering device then links participants' login/logout records to the corresponding TV channel information and reports them back to a remote TV viewership management server for further processing.

Setting aside the high cost of providing such a device to every household that has agreed to participate in a TV viewership survey, it may still be difficult for many participants to follow such a protocol accurately for other reasons. For example, a participant, who is watching a TV may leave the room where the TV is located to answer a call that turns out to last for an extended period of time. In this case, the TV viewership survey agency would assume that the participant is still watching the TV based on his or her login record, which constitutes a false positive data sample.

SUMMARY

In accordance with some implementations described below, a method for determining TV viewership information for one or more TV panelists is provided. The method includes: receiving TV broadcast information from a TV metering device, wherein the TV broadcast information identifies a current status of a TV in a household and an associated timestamp; receiving TV panelist status information from a first login/logout device that is different from the TV metering device, wherein the TV panelist status information identifies a viewership status of the TV panelist and an associated timestamp; and correlating the TV broadcast information with the TV panelist status information in accordance with their respective timestamps to determine a relationship between the TV panelist and a respective TV program currently broadcasted by the TV in the household.

In accordance with some implementations described below, a computer system for determining TV viewership information for one or more TV panelists is provided that includes memory to store one or more programs and one or more processors for executing the one or more programs. The one or more programs include instructions for: receiving TV broadcast information from a TV metering device, wherein the TV broadcast information identifies a current status of a TV in a household and an associated timestamp; receiving TV panelist status information from a first login/logout device that is different from the TV metering device, wherein the TV panelist status information identifies a viewership status of the TV panelist and an associated timestamp; and correlating the TV broadcast information with the TV panelist status information in accordance with their respective timestamps to determine a relationship between the TV panelist and a respective TV program currently broadcasted by the TV in the household.

In accordance with some implementations described below, a method for determining TV viewership information for one or more TV panelists is provided. The method includes: receiving a login request from a TV panelist through a first login/logout device; generating a TV viewership panelist record for the TV panelist in response to the login request, wherein the TV viewership panelist record identifies a first TV program that the TV panelist is currently watching in a household; receiving a logout request from the TV panelist through a second login/logout device that is different from the first login/logout device; and updating the TV viewership panelist record for the TV panelist in response to the logout request, wherein the updated TV viewership panelist record indicates a second TV program that the TV panelist stops watching in the household.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
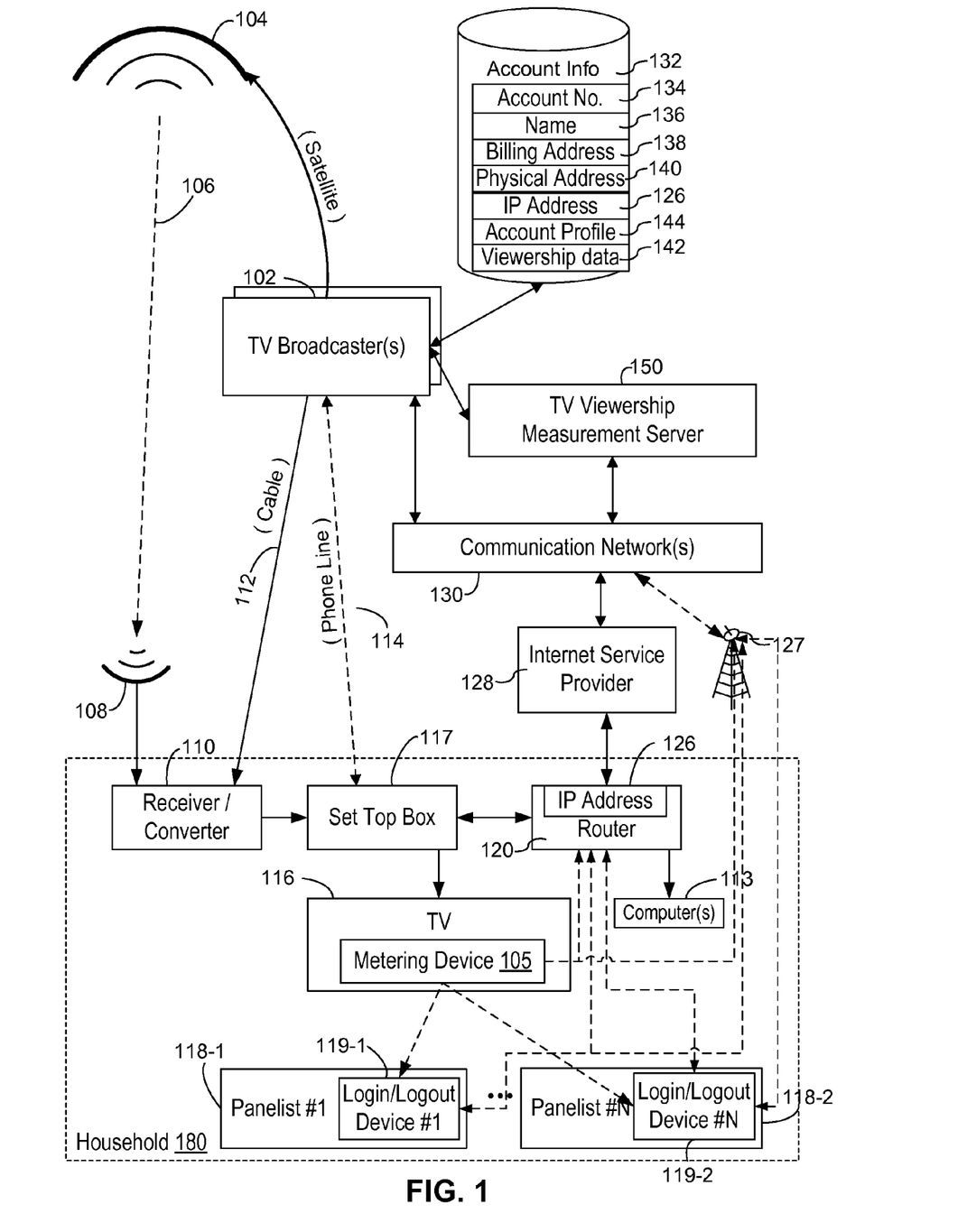
FIG. 1 is a block diagram illustrating a distributed TV content delivery and TV viewership measurement system including a plurality of communication channels for delivering TV signals to a household and TV viewership survey equipment including a TV metering device and one or more login/logout devices in the household and a TV viewership measurement server in accordance with some implementations.

FIG. 1 is a block diagram illustrating a distributed TV content delivery and TV viewership measurement system including a plurality of communication channels for delivering TV signals to a household and TV viewership survey equipment including a TV metering device and one or more login/logout devices in the household and a TV viewership measurement server in accordance with some implementations. In some implementations, one or more TV broadcasters 102 not only provide TV programs to its subscriber households but also collect account information 132 for particular subscriber households 180 that are retained for providing their household members' TV viewing activity information. The TV broadcasters provide their respective broadcasting schedule information, account information 132, and TV viewing activity information collected from different households to a TV viewership measurement server 150, which aggregates and analyzes such information to determine TV viewership ratings of one or more TV programs among different specific geodemographic categories (e.g., different combinations of TV viewers by age, sex and geographic region).

In some implementations, the households 180 for which the account and viewership data is retained in the database 132 are participants in TV viewership panels (also known as TV panelists or simply panelists) who have agreed that their TV viewing, account and demographic information can be collected, aggregated and analyzed to allow the TV viewership measurement server 150 to determine the TV viewership data for participant households 180. The account information database 132 generally includes an account number 134, a name 136, and a billing address 138 for each participant household. In some implementations, the account information 132 includes a physical address 140, such as a residence address for a household, and/or an IP address 126 associated with one or more Internet-enabled devices used by the household 180 to access the Interview and view streaming TV content and/or Internet-based services generally. In some cases, the household 180 has a fixed IP address 126, in which case the fixed IP address 126 is associated with the household's account in the database 132. In other cases, the household has a dynamically-allocated IP address, which can change on a regular basis (e.g., every time a household member "dials up," or makes a new connection to, the Internet service provider 128 (ISP)). In this case, the broadcaster 102 tracks the changes to the household's IP address 126 and updates the record of the household 180 in the database 132 accordingly. In some cases, the account information database 132 includes an account profile 144 associated with each household. The account profile 144 may include one or more demographic parameters that characterize the household members including, but not limited to, the number of household members and the age, gender, educational level, income, and profession of at least one household member. In some cases, the account information database 132 includes the TV viewership data 142 associated with each account. For instance, the TV viewership data 142 may include either the data sample collected from a household, such as the date and time indicating when the data sample was collected and information about the TV program being watched by the household members when the data sample was collected, or other data sample, such as the broadcasting duration of the TV program at the household. As shown in FIG. 1, the database 132 may include the TV viewership data collected from multiple TV broadcasters 102. A data pre-processing procedure may be applied to the data from different sources if their formats are different from the one used by the database 132.

In some implementations, the TV viewership data 142 can include information on every TV program viewed by the household, including, for each program, name and synopsis of the program, a channel that played the program, date/time of the viewing, etc. In other implementations, the TV viewership data 142 includes only programs that are viewed for at least a threshold amount of time (e.g., 1 minute or 5 minutes) as well as the start time of a program and the end time of the program. In some implementations, the TV viewing activity tracked by the TV viewership measurement server 150 includes only premium content.

As show in FIG. 1, the TV broadcasters 102 may transmit television programs to the household 180 over a cable 112, by transmission from a satellite 104, or by streaming over the Internet. In the case of satellite transmissions 106, the household 180 has a receiver antenna 108 to receive the signal, which is coupled to a receiver or converter 110 inside the household 180 to process or decode the incoming TV signals. The decoded TV signals are transmitted to a set top box 117, which allows TV panelists (118-1, 118-2) to control what is to be played on the television 116. In some implementations, the receiver/converter 110 is combined with the set top box 117. In general, a panelist controls the set top box 117 with a remote control device. In some implementations, there is additional communication between the TV broadcaster 102 and the set top box 117 over a telephone line 114. For example, the set top box 117 may provide information about what television programs are being viewed or have been viewed, or may receive information for interactive television programs. The TV broadcaster 102 processes information about the panelists' viewing activity from the set top box 117 and stores the processed information in the database 132.

The actual television program signals are generally transmitted by satellite 104 or over a cable 112. In some implementations, the television programs are streamed over the communications network 130, such as the Internet. In these implementations, the process of selecting a television program may be performed by a computer 113, the set top box 117, or the receiver/converter 110 that is connected directly to the household router 120. The household router 120 is the gateway to the Internet from the household 180. Inside the household 180, the router 120 is connected to the set top box 117, and in some cases to one or more computers 113, wired or wirelessly. The router 120 is connected to the communication network 130 through an Internet service provider 128. The Internet service provider 128 is responsible for assigning the IP address 126 to the home router 120.

The computers 113 in the household 180 can access the Internet to perform myriad activities, such as watching TV programs streamed from the TV broadcaster 102 through the communication networks 130, the Internet service provider 128, and the household router 120, or allowing a TV panelist to access (including update) his or her TV viewership account managed by the TV viewership measurement server 150. One of ordinary skill in the art would recognize that the term "computer" refers to different types of device that has the data processing and network capabilities, including desktop, laptop, tablet, netbook, smart phone, etc. Note that the computers 113 may be located in the same room as the TV 116 or a different room that is away from the TV 116.

In some implementations, the TV viewership measurement server 150 is coupled to the communication networks 130 for collecting TV broadcasting information from different households that have agreed to be surveyed by the TV viewership measurement server 150 and the TV viewing activity information of panelists in those households and analyzing the collected information to estimate the TV viewership ratings associated with different TV programs.

In some implementations, the TV viewership measurement server 150 receives an explicit or implicit authorization from members of a household 180 before collecting any TV viewing activity information from the household. For example, the household 180 may provide this authorization as part of the contract it has with the TV broadcaster 102. Alternatively, the household 180 may have a separate contract with an agency that operates the TV viewership measurement server 150 which provides that the household 180 agrees to provide its TV viewing activity information to the agency. In either case, the household 180 is provided with certain equipment (e.g., the metering device 105 or the like), which is used for collecting the TV broadcasting information and reporting the information to the TV viewership measurement server 150. As part of the contract, TV panelists in the household 180 agree to an information collection protocol that they will first log into their accounts at the server 150 when they start watching any program on the TV 116 and then log out from the server 150 if they stop watching the TV.

As shown in FIG. 1, the metering device 105 is a built-in component of the TV 116. In some implementations, the metering device 105 is configured to detect activities at the TV 116. For example, the metering device 105 may generate a data record in connection with the on/off/change-of-channel events at the TV 116. The data record may include a record identifier, a recording timestamp, and a status indicator indicating what TV channel is being broadcasted by the TV. In some implementations, the record also includes a metering device identifier that uniquely identifies the metering device 105. In some other implementations, the metering device 105 is a separate piece of hardware that is outside the TV 116 but is connected to the TV 116, wired or wireless, with the capability of detecting the events happening at the TV 116.

Instead of logging into his or her account at the TV viewership measurement server 150 directly through the metering device 105, a TV panelist (118-1 or 118-2) may carry a login/logout device (119-1 or 119-2) separately so that the panelist can log into his or her account from the login/logout device or log out thereof. For example, the login/logout device can be a smart phone (e.g., an Android mobile phone) that has installed a mobile application associated with the TV viewership measurement server 150. Whenever the TV panelist plans to watch the TV 116, he or she can register his or her active TV viewership status by starting the mobile application installed in the device. If the TV panelist then moves away from the TV 116 to handle a different matter (e.g., answering a call in a different room) and will not come back to watch the TV for more than a predefined period of time, he or she can then log out of the TV viewership measurement server 150 without having to come back to the room where the TV 116 is located.

As shown in FIG. 1, there are multiple communication paths between the metering device 105, the login/logout device 119 on one side and the TV viewership measurement server 150 on the other side. For example, the metering device 105 and the login/logout device 119 can be connected to the home router 120 through Wi-Fi connection so that both the TV broadcast information and the TV panelists' viewership status information can be transmitted to the TV viewership measurement server 150 via the Wi-Fi connection. Alternatively, the metering device 105 or the login/logout device 119 or both may be able to directly communicate with a base station 127 in the neighborhood so that the information collected by the two types of devices can be transmitted to the server 150 through a wireless network including the base station 127. In this case, the metering device 105 is configured to act as a member of the Internet of Things (IOT) that supports data traffic from the metering device 105 to the server 150 or from the metering device 150 to the server 150.

In some implementations, the removal of the login/logout functionality from the metering device 105 makes it possible for a TV panelist to update his or her status from multiple platforms. As described above, the TV panelist may be able to use his or her smart phone to do so by installing a mobile application on the smart phone. In this case, the login/logout device 119 is in the form of a smart phone. Alternatively, the TV panelist may also install the mobile application on his or her tablet, laptop, desktop, or netbook computer so that he or she can update his or her status anywhere (e.g., even if the TV panelist has to leave his or her house for an errand). In some implementations, the login/logout device 119 is a dedicated electronic device that is employed by a panelist to enter and to report to the TV viewership measurement server 150 their personal login/logout information.

Figure 2A:
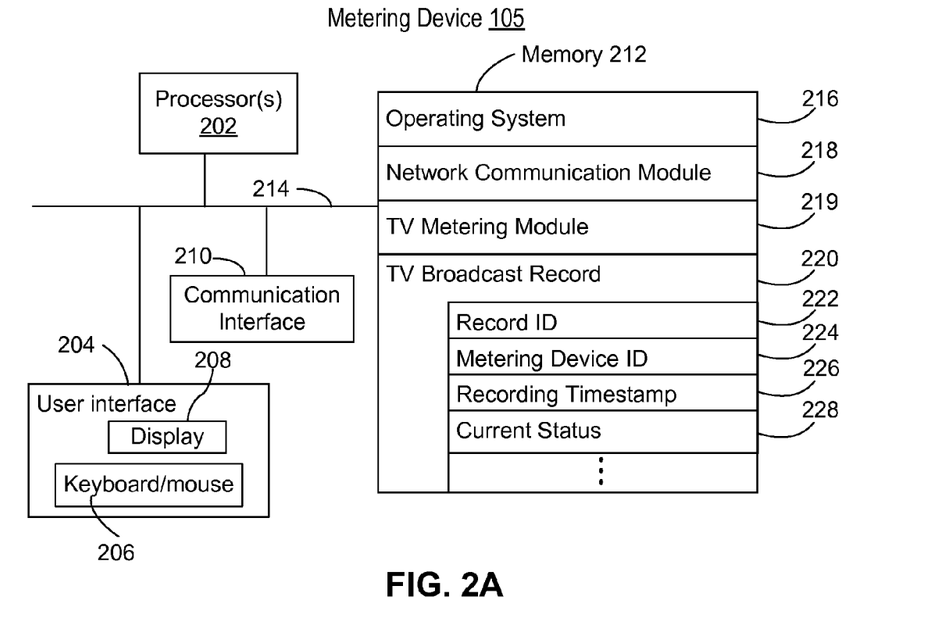
FIG. 2A is a block diagram illustrating the components of a TV metering device configured for determining and reporting TV broadcast information in accordance with some implementations.

FIG. 2A is a block diagram illustrating the components of a TV metering device 105 configured for determining and reporting TV broadcast information in accordance with some implementations. The TV metering device 105 includes one or more processors 202 for executing modules, programs and/or instructions stored in memory 212 and thereby performing predefined operations; one or more network or other communications interfaces 210; memory 212; and one or more communication buses 214 for interconnecting these components. In some implementations, the TV metering device 105 includes a user interface 204 comprising a display device 208 and one or more input devices 206 (e.g., keyboard or mouse). In some implementations, the TV metering device 105 is a component built-into a TV.

In some implementations, the memory 212 includes high-speed random access memory, such as DRAM, SRAM, DDR RAM or other random access solid state memory devices. In some implementations, memory 212 includes non-volatile memory, such as one or more magnetic disk storage devices, optical disk storage devices, flash memory devices, or other non-volatile solid state storage devices. In some implementations, memory 212 includes one or more storage devices remotely located from the processor(s) 202. Memory 212, or alternately one or more storage devices (e.g., one or more nonvolatile storage devices) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communications module 218 that is used for connecting the TV metering device 105 to other computers via the communication network interfaces 210 and one or more communication networks (wired or wireless), such as the Internet, other wide area networks, local area networks, metropolitan area networks, etc.;
- a TV metering module 219 for generating a TV broadcast record upon detecting one of a plurality of predefined events at the TV 116, e.g., the TV 116 being turned on or off or switched from one channel to another channel, etc.; and
- a plurality of TV broadcast records 220, each TV broadcast record including a record ID 222, a metering device ID 224, a recording timestamp 226, and a current status of the TV 116 indicating, e.g., the TV 116 is on or off or broadcasting a particular channel, etc.

Figure 2B:
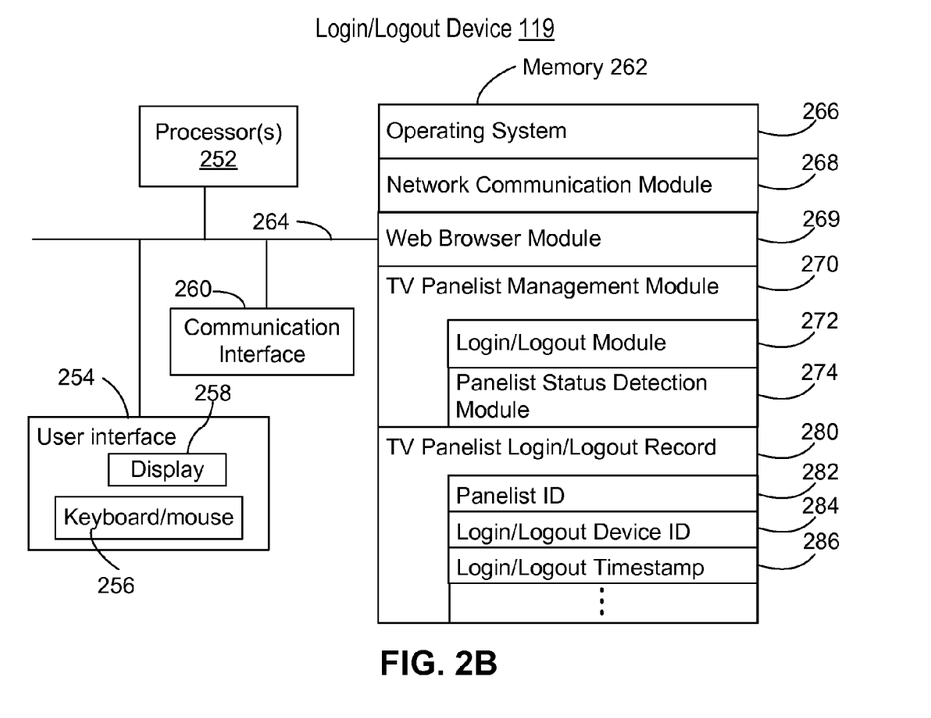
FIG. 2B is a block diagram illustrating the components of a login/logout device configured for tracking a TV panelist's TV viewing activities in accordance with some implementations.

FIG. 2B is a block diagram illustrating the components of a login/logout device 119 configured for tracking a TV panelist's TV viewing activities in accordance with some implementations. The login/logout device 119 includes one or more processors 252 for executing modules, programs and/or instructions stored in memory 262 and thereby performing predefined operations; one or more network or other communications interfaces 260; memory 262; and one or more communication buses 264 for interconnecting these components. In some implementations, the login/logout device 119 includes a user interface 254 comprising a display device 258 and one or more input devices 256 (e.g., a hard/soft keyboard or mouse). In some implementations, the login/logout device 119 is one of a smart phone, a tablet computer, a laptop computer, a desktop computer, a netbook computer or the like.

In some implementations, the memory 262 includes high-speed random access memory, such as DRAM, SRAM, DDR RAM or other random access solid state memory devices. In some implementations, memory 262 includes non-volatile memory, such as one or more magnetic disk storage devices, optical disk storage devices, flash memory devices, or other non-volatile solid state storage devices. In some implementations, memory 262 includes one or more storage devices remotely located from the processor(s) 252. Memory 262, or alternately one or more storage devices (e.g., one or more nonvolatile storage devices) within memory 262, includes a non-transitory computer readable storage medium. In some implementations, memory 262 or the computer readable storage medium of memory 262 stores the following programs, modules and data structures, or a subset thereof:

- an operating system 266 that includes procedures for handling various basic system services and for performing hardware dependent tasks;
- a network communications module 268 that is used for connecting the login/logout device 119 to other computers via the communication network interfaces 260 and one or more communication networks (wired or wireless), such as the Internet, other wide area networks, local area networks, metropolitan area networks, etc.;
- a web browser module 269 for accessing the TV viewership measurement server 150 via the Internet and downloading client-side applications (including a mobile application for a panelist to log into/out of the server 150) onto the login/logout device 119;
- a TV panelist management module 270 for helping a TV panelist manage his or her registration status at the server 150, further including a login/logout module 272 for handling the panelist's request to log into his or her account at the server 150 or log out of his or her account at the server 150, and a panelist status detection module 274 for detecting changes to the panelist's viewership status, e.g., the panelist has left the room where the TV 116 is located or the panelist has logged out from another login/logout device, etc., and notifying the panelist of such changes accordingly; and
- one or more TV panelist login/logout records 280, each TV panelist login/logout record including a panelist ID 282, a login/logout device ID 284, and a login/logout timestamp 286.

In some implementations, the login/logout device 119 is a mobile device such as a smart phone or a tablet computer. The mobile device installs a mobile application for handling a TV panelist's login/logout requests. In addition, the mobile application may be configured to detect whether the TV panelist is still watching the TV 116. For example, the login/logout device 119 is configured to receive a heartbeat signal from the TV metering device 105 at a predefined time interval after the TV panelist logs into his or her account through the device 119. After that, the login/logout device 119 may deem that the TV panelist has stopped watching the TV if it fails to receive the heartbeat signal for a predefined amount of time or if it determines that the strength of the heartbeat signal has dropped below a predefined threshold (e.g., the signal may be substantially attenuated if the distance between the login/logout device 119 and the metering device 105 is more than a predefined distance or if there is one or more walls separating the two). When this happens, the mobile application may cause the login/logout device 119 to generate an alert signal (e.g., a vibration signal or a flash signal on the screen) to remind the TV panelist that he or she should either log out from the TV viewership measurement server 150 or return to the room where the TV 116 is located. The panelist, in response, can log out and therefore update his or her status at the server 150.

Figure 3:
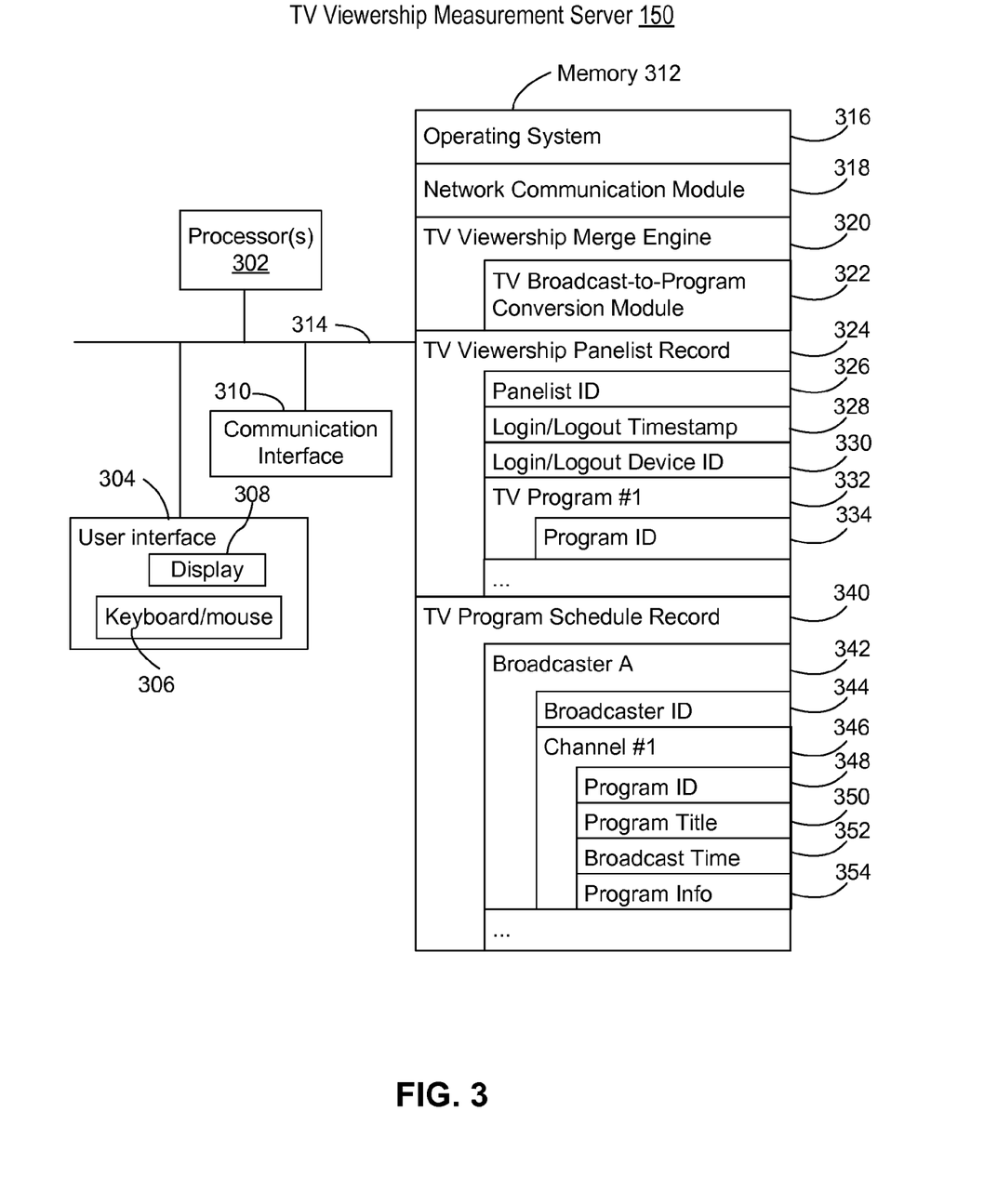
FIG. 3 is a block diagram illustrating the components of a TV viewership measurement server configured for determining the TV viewership data based on the TV broadcast information and TV viewing activities reported by different households in accordance with some implementations.

FIG. 3 is a block diagram illustrating the components of a TV viewership measurement server 150 that are configured for determining the TV viewership data based on the log entries from different households in accordance with some implementations. The measurement server 150 includes one or more processors 302 for executing modules, programs and/or instructions stored in memory 312 and thereby performing predefined operations; one or more network or other communications interfaces 310; memory 312; and one or more communication buses 314 for interconnecting these components. In some implementations, the measurement server 150 includes a user interface 304 comprising a display device 308 and one or more input devices 306 (e.g., keyboard or mouse).

In some implementations, the memory 312 includes high-speed random access memory, such as DRAM, SRAM, DDR RAM or other random access solid state memory devices. In some implementations, memory 312 includes non-volatile memory, such as one or more magnetic disk storage devices, optical disk storage devices, flash memory devices, or other non-volatile solid state storage devices. In some implementations, memory 312 includes one or more storage devices remotely located from the processor(s) 302. Memory 312, or alternately one or more storage devices (e.g., one or more nonvolatile storage devices) within memory 312, includes a non-transitory computer readable storage medium. In some implementations, memory 312 or the computer readable storage medium of memory 312 stores the following programs, modules and data structures, or a subset thereof:

- an operating system 316 that includes procedures for handling various basic system services and for performing hardware dependent tasks;
- a network communications module 318 that is used for connecting the measurement server 150 to other computers via the communication network interfaces 310 and one or more communication networks (wired or wireless), such as the Internet, other wide area networks, local area networks, metropolitan area networks, etc.;
- a TV viewership merge engine 320 for correlating TV broadcast information provided by the metering device 105 with TV panelist status information provided by the login/logout device 119 in accordance with their respective timestamps to determine a relationship between the TV panelist and a respective TV program currently broadcasted by the TV 116, the engine further including a TV broadcast-to-program conversion module 322 for determining what program is currently broadcasted by the TV 116;

a plurality of TV viewership panelist records 324, each TV viewership panelist record including a panelist ID 326, a login/logout timestamp 328, a login/logout device ID 330, and information (e.g., program ID 334) about a TV program 332 watched by the panelist during one viewing session between a login timestamp and a logout timestamp; and a plurality of TV program schedule records 340, each TV program schedule record including information of a broadcaster 342, e.g., a broadcaster ID 344 and a channel 346 that further includes a program ID 348, a program title 350, a broadcast time 352, and other program information 354.

In some implementations, the TV broadcast-to-program conversion module 322 uses the TV program schedule records 340 and the TV broadcast records 220 from a TV metering device 105 to determine what TV program has been broadcasted at the corresponding TV. After determining the TV program, the TV viewership merge engine 320 inserts its associated program 334 into a corresponding TV viewership panelist record 324 by checking which panelist has logged into his or her account at that time in the household. As such, the information in the TV viewership panelist record 324 can be used for many other purposes, such as determining the rating of a particular program within a particular geographical region (e.g., national or regional) or within a particular demographic group by further correlating the TV viewership panelist record 324 with the corresponding account information 132.

Figure 4A:
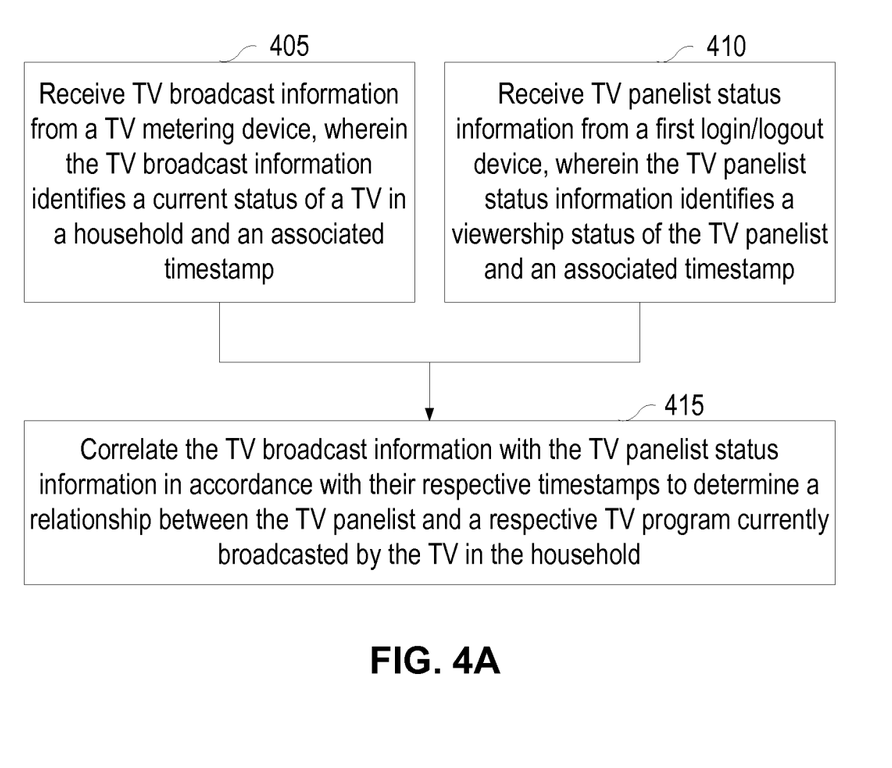
FIGS. 4A and 4B are flow charts illustrating how the TV viewership measurement server generates TV viewership panelist records in accordance with some implementations.
Figure 4B:
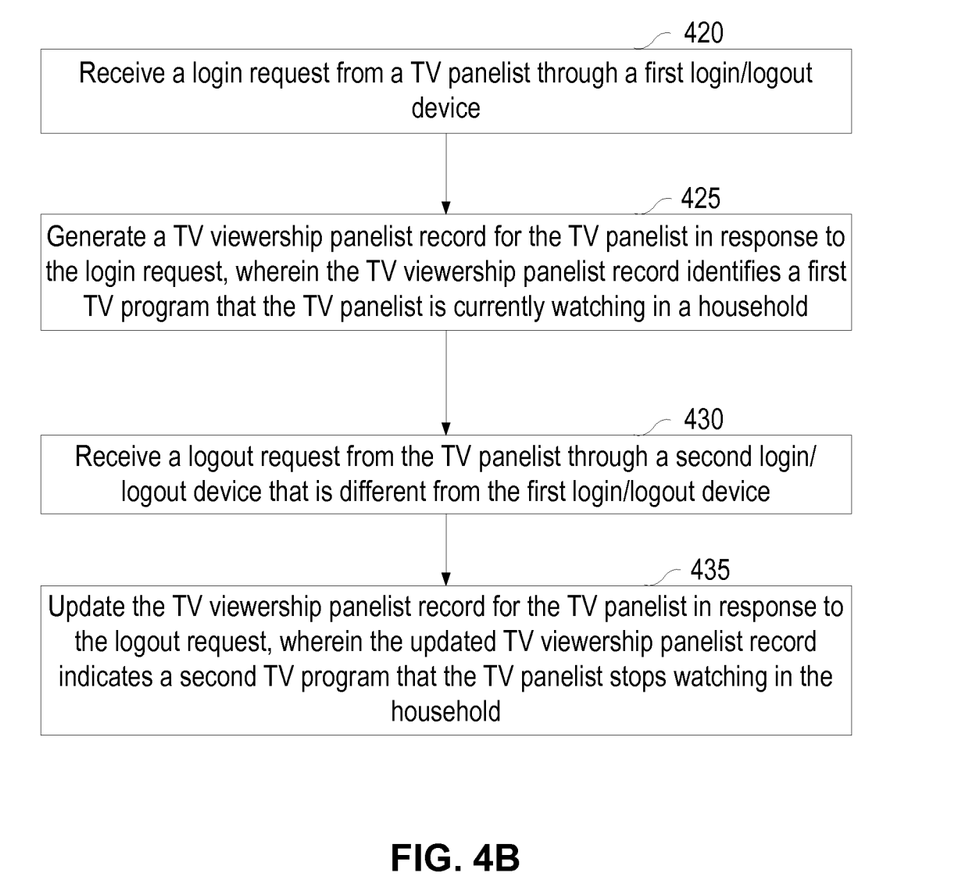

FIGS. 4A and 4B are flow charts illustrating how the TV viewership measurement server generates TV viewership panelist records in accordance with some implementations.

As shown in FIG. 4A, the TV viewership measurement server 150 receives (405) TV broadcast information from a TV metering device 105 and receives (410) TV panelist status information from a login/logout device, wherein the TV panelist status information identifies a viewership status of the TV panelist and an associated timestamp. In response to the two types of information, the TV viewership measurement server 150 correlates the TV broadcast information with the TV panelist status information in accordance with their respective timestamps to determine a relationship between the TV panelist and a respective TV program currently broadcasted by the TV in the household.

In some implementations, the TV broadcast information corresponds to a TV broadcast record that includes a TV metering device ID, the current status of the TV, and the associated timestamp, the current status of the TV identifying a current broadcasting channel of the TV and an audio fingerprint associated with the current broadcasting channel. The TV panelist status information corresponds to a TV panelist status record that includes a TV panelist ID, a login/logout device ID, the TV panelist's viewership status, and the associated timestamp. The first login/logout device includes at least one of a smart phone, a tablet computer, a laptop computer, and a desktop computer.

In some implementations, the computer server is configured to receive a login request from the TV panelist through a first login/logout device and then receive a logout request from the TV panelist through a second login/logout device that is different from the first login/logout device. For example, the panelist may log into his or her account through a mobile phone while sitting in front of the TV and then moves away from the TV to take care of a different matter, e.g., working in front of a desktop computer. In some cases, the panelist can start an application on the computer to logout operation after realizing that he or she should log out from the server 150. Alternatively, the panelist may be reminded of doing so if the mobile phone through which he or she logs into the server 150 generates an alert signal as described above. In either case, the panelist can take appropriate steps to satisfy the TV viewership registration protocol without disrupting what he or she is currently doing. Compared with the conventional approach of integrating the login/logout device into the metering device, this approach is more flexible and can reduce the deployment overhead for a TV survey system since it requires less hardware support.

As shown in FIG. 4B, the TV viewership measurement server 150 receives (420) a login request from a TV panelist through a first login/logout device. In response, the server 150 generates (425) a TV viewership panelist record for the TV panelist in response to the login request, and the TV viewership panelist record identifies a first TV program that the TV panelist is currently watching in a household. At a subsequent moment, the server 150 receives (30) a logout request from the TV panelist through a second login/logout device that is different from the first login/logout device. For example, the TV panelist may log into his or her account first from a smart phone and then log out from a desktop computer as described above. In response, the server 150 updates (435) the TV viewership panelist record for the TV panelist in response to the logout request, and the updated TV viewership panelist record indicates a second TV program that the TV panelist stops watching in the household.

In some implementations, after receiving the login request, the server also sends a login notification to the second login/logout device, e.g., if the device is also active. In response to the login notification, the second login/logout device updates to the panelist's TV viewership status at the second login/logout device, e.g., from logout to login, in order to be consistent with the first device. In some implementations, after receiving the logout request, the server sends a logout notification back to the first login/logout device and causes an update to the TV viewership status of the TV panelist at the first login/logout device, e.g., from login to logout, in order to be consistent with the second device.

In some implementations, the server receives a plurality of TV broadcast records from a TV metering device, each TV broadcast record identifies a current status of a TV in a household and an associated timestamp. The TV metering device may be a built-in component of the TV or a standalone device that is able to detect the change of state at the TV, e.g., from on to off, from off to on, or from one channel to another channel, etc.

In some implementations, the TV metering device and the first and second login/logout devices are configured to transmit the TV broadcast records and the TV panelist status information, respectively, via a wireless network. For example, the TV metering device may be a member of the Internet of Things; the first login/logout device may be a smart phone and the second device may be a tablet computer. In some cases, the first login/logout device (e.g., a smart phone or a tablet computer) is configured to transmit the login request via a wireless network and the second login/logout device (e.g., a desktop computer) is configured to transmit the logout request via a wired network.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

While particular embodiments are described above, it will be understood it is not intended to limit the invention to these particular embodiments. On the contrary, the invention includes alternatives, modifications and equivalents that are within the spirit and scope of the claims. For example, the same invention as described above can be easily adapted for logging the IP TV streaming activities and other non-broadcast media consumption (such as games consoles, DVD viewing, etc.) which is viewed on a TV screen or other display devices (including, for example, a monitor, smart phone, portable media player, personal digital assistant, handheld game console, multi-touch handheld device, tablet computer, laptop computer, and desktop computer). Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Finally, the foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method for determining TV viewership information for one or more TV panelists, the method comprising:
   at a computer server having memory and one or more processors:
      receiving a login request from a TV panelist through a first login/logout device;
      generating a TV viewership panelist record for the TV panelist in response to the login request, wherein the TV viewership panelist record identifies a first TV program that the TV panelist is currently watching on a TV in a household, the household including a plurality of TV panelists, each associated with at least one respective login/logout device, wherein the plurality of TV panelists comprises the TV panelist who sends the login request via the first login/logout device;
      receiving a logout request from the same TV panelist through a second login/logout device that is different from the first login/logout device;
      updating the TV viewership panelist record for the TV panelist in response to the logout request, wherein the updated TV viewership panelist record indicates a second TV program that the TV panelist stops watching in the household; and
      after receiving the login request, sending a login notification to the second login/logout device, wherein the login notification causes an update to the viewer status of the TV panelist at the second login/logout device;
      wherein the first login/logout device is a mobile device configured to communicate corresponding TV panelist status information to the computer server independently from a TV metering device, wherein the corresponding TV panelist status information identifies a viewer status that indicates whether the TV broadcast information is attributed to viewing activities of the TV panelist.

2. The computer-implemented method of claim 1, further comprising:
   after receiving the logout request,
      sending a logout notification to the first login/logout device, wherein the logout notification causes an update to the viewer status of the TV panelist at the first login/logout device.

3. The computer-implemented method of claim 1, wherein the first and second login/logout devices each include at least one of: a smart phone, a tablet computer, a laptop computer, and a desktop computer.

4. The computer-implemented method of claim 1, further comprising:

receiving a plurality of TV broadcast records from the TV metering device, each TV broadcast record identifies a current status of the TV in a household and an associated timestamp.

5. The computer-implemented method of claim 4, wherein the TV metering device is a built-in component of the TV.

6. The computer-implemented method of claim 4, wherein the TV metering device and the first and second login/logout devices are configured to transmit the TV broadcast records and the TV panelist status information, respectively, via a wireless network.

7. The computer-implemented method of claim 1, wherein the first login/logout device is configured to transmit the login request via a wireless network and the second login/logout device is configured to transmit the logout request via a wired network.

8. A method for determining viewership information, comprising:
receiving, by a TV viewership measurement server from a metering device associated with a TV, a TV broadcast record comprising a recording timestamp and an identification of content output by the TV;
receiving, by the TV viewership measurement server from a login/logout device associated with a panelist, a login record comprising a login timestamp and a panelist identification;
receiving, by the TV viewership measurement server from the login/logout device associated with the panelist, a logout record comprising a logout timestamp and the panelist identification;
determining, by a merge engine of the TV viewership measurement server, that the recording timestamp of the TV broadcast record is between the login timestamp of the login record and logout timestamp of the logout record; and
generating, by the merge engine, a viewership record comprising the panelist identification and the identification of content output by the TV, responsive to the determination; and
transmitting, by the TV viewership measurement server to the login/logout device, a login notification, responsive to receiving the login record from the first login/logout device.

9. The method of claim 8, wherein the identification of content output by the TV comprises an identification of a tuned-to channel, and further comprising:
identifying, by a TV Broadcast-to-Program conversion module of the TV viewership measurement server from a broadcast schedule, a broadcast program based on the identification of the tuned-to channel and the recording timestamp; and
wherein the generated viewership record further comprises an identification of the broadcast program.

10. The method of claim 8, wherein receiving the logout record further comprises:
receiving, by the TV viewership measurement server from the login/logout device, the logout record generated responsive to the login/logout device failing to receive a heartbeat signal from the metering device within a predefined amount of time.

11. The method of claim 8, wherein the login/logout device comprises a portable device of the panelist executing a login/logout application.

12. A method for determining viewership information, comprising:
receiving, by a TV viewership measurement server from a metering device associated with a TV, a TV broadcast record comprising a recording timestamp and an identification of content output by the TV;
receiving, by the TV viewership measurement server from a first login/logout device associated with a panelist, a login record comprising a login timestamp and a panelist identification;
receiving, by the TV viewership measurement server from a second, different login/logout device associated with the panelist, a logout record comprising a logout timestamp and the panelist identification;
determining, by a merge engine of the TV viewership measurement server, that the recording timestamp of the TV broadcast record is between the login timestamp of the login record and logout timestamp of the logout record;
generating, by the merge engine, a viewership record comprising the panelist identification and the identification of content output by the TV, responsive to the determination; and
transmitting, by the TV viewership measurement server to the second login/logout device, a login notification, responsive to receiving the login record from the first login/logout device.

13. The method of claim 12, wherein the identification of content output by the TV comprises an identification of a tuned-to channel, and further comprising:
identifying, by a TV Broadcast-to-Program conversion module of the TV viewership measurement server from a broadcast schedule, a broadcast program based on the identification of the tuned-to channel and the recording timestamp; and
wherein the generated viewership record further comprises an identification of the broadcast program.

14. The method of claim 12, wherein the login record comprises an identifier of the first login/logout device, and wherein the logout record comprises an identifier of the second login/logout device.

15. The method of claim 12, further comprising transmitting, by the TV viewership measurement server to the first login/logout device, a logout notification, responsive to receiving the logout record from the second login/logout device.

16. The method of claim 12, wherein the first login/logout device comprises a portable device of the panelist executing a login/logout application; and wherein the second login/logout device comprises a desktop device of the panelist.

17. A method for determining viewership information, comprising:
receiving, by a TV viewership measurement server from a metering device associated with a TV, a first TV broadcast record comprising a first recording timestamp and a first identification of content output by the TV;
subsequently receiving, by the TV viewership measurement server from the metering device, a second TV broadcast record comprising a second recording timestamp and a second identification of content output by the TV;
receiving, by the TV viewership measurement server from a login/logout device associated with a panelist, a login record comprising a login timestamp and a panelist identification;
determining, by a merge engine of the TV viewership measurement server, that the login timestamp of the login record is between the first recording timestamp and the second recording timestamp;

receiving, by the TV viewership measurement server from a second, different login/logout device, a logout record comprising a logout timestamp and the panelist identification;

determining, by the merge engine, that the second recording timestamp is between the login timestamp and the logout timestamp, generating, by the merge engine, a viewership record comprising the panelist identification, the first identification of content output by the TV, and the second identification of content output by the TV, responsive to the determination that the login timestamp of the login record is between the first recording timestamp and the second recording timestamp and responsive to the determination that the second recording timestamp is between the login timestamp and the logout timestamp;

transmitting, by the TV viewership measurement server to the first login/logout device, a logout notification, responsive to receiving the logout record from the second login/logout device.

18. The method of claim 17, further comprising:

receiving, by the TV viewership measurement server from the login/logout device, a logout record comprising a logout timestamp and the panelist identification;

determining, by the merge engine, that the second recording timestamp is between the login timestamp and the logout timestamp; and wherein the generated viewership record further comprises the second identification of content output by the TV, responsive to the determination that the second recording timestamp is between the login timestamp and the logout timestamp.

19. The method of claim 17, further comprising transmitting, by the TV viewership measurement server to the second login/logout device, a login notification, responsive to receiving the login record from the first login/logout device.

20. The method of claim 17, wherein the first identification of content output by the TV comprises an identification of a first tuned-to channel, and further comprising:

identifying, by a TV Broadcast-to-Program conversion module of the TV viewership measurement server from a broadcast schedule, a first broadcast program based on the first identification of the tuned-to channel and the first recording timestamp; and wherein the generated viewership record further comprises an identification of the broadcast program.

* * * * *